(12) United States Patent
Grant et al.

(10) Patent No.: US 8,508,486 B2
(45) Date of Patent: Aug. 13, 2013

(54) DIRECTIONAL HAPTIC EFFECTS FOR A HANDHELD DEVICE

(75) Inventors: Danny A. Grant, Laval (CA); Robert W. Heubel, San Leandro, CA (US)

(73) Assignee: Immersion Corporation, San Jose, CA (US)

( * ) Notice: Subject to any disclaimer, the term of this patent is extended or adjusted under 35 U.S.C. 154(b) by 873 days.

(21) Appl. No.: 11/865,224

(22) Filed: Oct. 1, 2007

(65) Prior Publication Data

US 2009/0085882 A1 Apr. 2, 2009

(51) Int. Cl.
*G09G 5/00* (2006.01)
(52) U.S. Cl.
USPC ..... 345/173; 345/174; 178/18.01; 178/18.09; 455/566; 455/556.1; 455/556.2
(58) Field of Classification Search
USPC .......................... 345/156, 157, 169, 173–197; 178/19.01–19.09, 18.01–18.09; 455/550, 455/566, 575, 90.1–90.3
See application file for complete search history.

(56) References Cited

U.S. PATENT DOCUMENTS

| | | | | |
|---|---|---|---|---|
| 5,097,102 | A * | 3/1992 | Yoshimura et al. | 345/178 |
| 6,712,613 | B2 * | 3/2004 | Depta | 434/114 |
| 7,182,691 | B1 | 2/2007 | Schena | |
| 7,342,573 | B2 * | 3/2008 | Ryynanen | 345/173 |
| 7,982,724 | B2 * | 7/2011 | Hill | 345/177 |
| 2002/0080112 | A1 | 6/2002 | Braun et al. | |
| 2004/0164971 | A1 | 8/2004 | Hayward et al. | |
| 2004/0207542 | A1 | 10/2004 | Chang et al. | |
| 2006/0061545 | A1 | 3/2006 | Hughes et al. | |
| 2006/0129719 | A1 * | 6/2006 | Cruz-Hernandez et al. | 710/58 |
| 2008/0280657 | A1 * | 11/2008 | Maenpaa et al. | 455/575.1 |
| 2010/0160016 | A1 * | 6/2010 | Shimabukuro et al. | 463/16 |

FOREIGN PATENT DOCUMENTS

| | | |
|---|---|---|
| JP | 2000-056923 | 2/2000 |
| JP | 2004-310196 | 11/2004 |
| JP | 2006-065456 | 3/2006 |

OTHER PUBLICATIONS

Notification of Reason for Refusal as issued for Japanese Patent Application No. 2010-528038, dated May 14, 2013.

* cited by examiner

*Primary Examiner* — Quan-Zhen Wang
*Assistant Examiner* — Jennifer Nguyen
(74) *Attorney, Agent, or Firm* — Pillsbury Winthrop Shaw Pittman LLP

(57) ABSTRACT

A handheld device includes at least two sections that are substantially mechanically isolated. Each section includes an actuator that generates haptic effects. The haptic effects generated by an actuator in one section are substantially isolated to that section so that, for example, directional haptic effects can be generated on the handheld device.

18 Claims, 3 Drawing Sheets ically isolated.
Each section includes an actuator that generates haptic

DIRECTIONAL HAPTIC EFFECTS FOR A HANDHELD DEVICE

FIELD OF THE INVENTION

One embodiment is directed to a handheld device. More particularly, one embodiment is directed to a handheld device that includes directional haptic effects.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants ("PDA"s), portable gaming devices, and a variety of other handheld devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

For some applications, there is a need for a handheld device to include directional feedback, where the handheld device can indicate a direction (e.g., left, right, etc.) to the user. One known method for creating directional feedback is to place an actuator on the far right of the handheld device and the other on the far left, both grounded to the housing of the handheld device. However, because most handheld devices have a generally rigid housing, it is difficult to tell which actuator is actually moving the device, and it is difficult for a user to determine which actuator in the device is creating the vibration.

Based on the foregoing, there is a need for an improved directional haptic system and method for generating haptic effects for a touchscreen.

SUMMARY OF THE INVENTION

One embodiment is a handheld device that includes at least two sections that are substantially mechanically isolated. Each section includes an actuator that generates haptic effects. The haptic effects generated by an actuator in one section are substantially isolated to that section so that, for example, directional haptic effects can be generated on the handheld device.

DETAILED DESCRIPTION

One embodiment is a handheld device that includes multiple actuators for generating haptic effects. Each actuator is placed in a section of the device that is mechanically isolated from the remainder of the device. Therefore, vibration generated by each actuator is isolated to a specific portion of the device.

Figure 1:
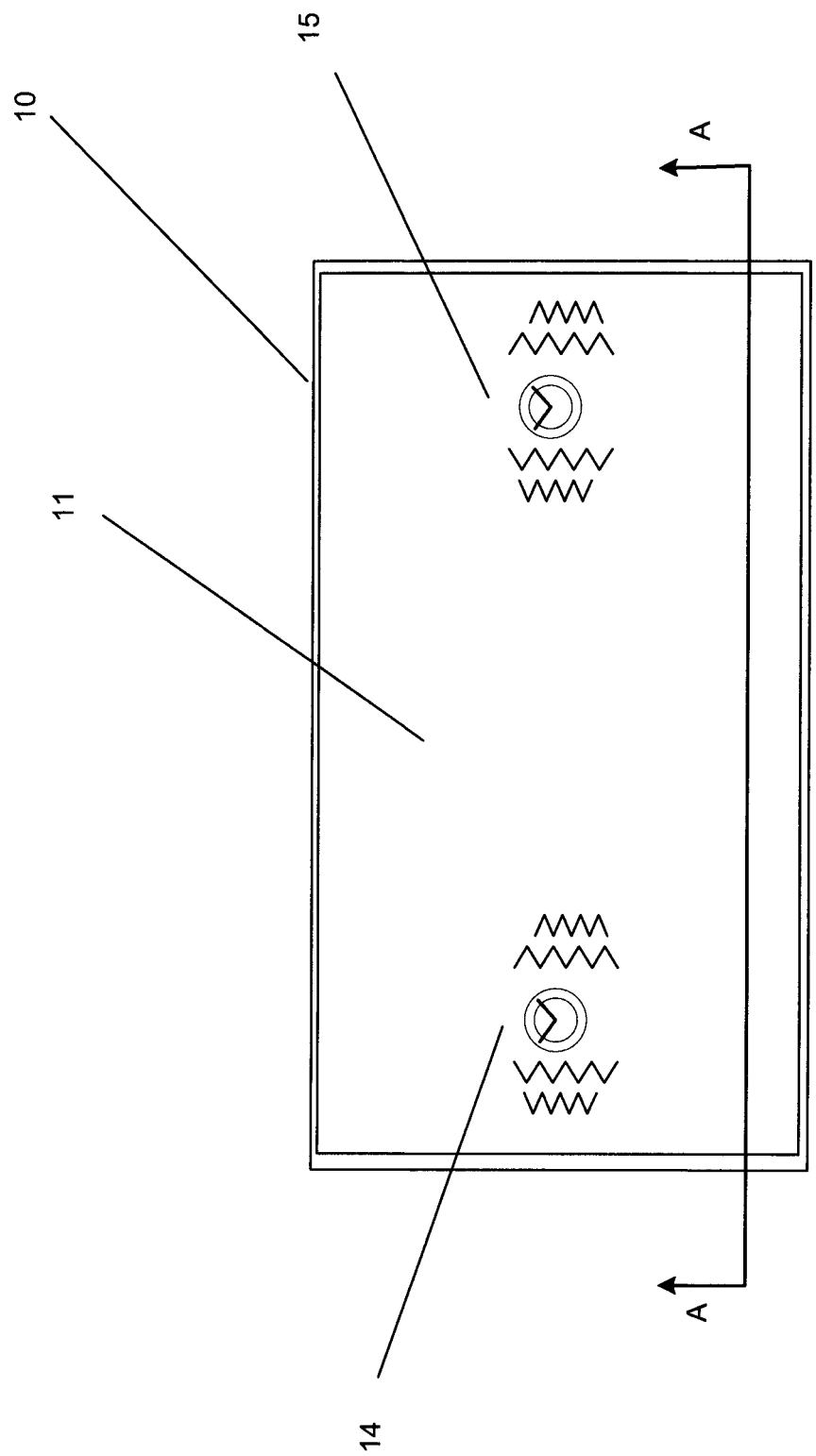
FIG. 1 is a block diagram of the top side of a handheld device in accordance with one embodiment.

FIG. 1 is a block diagram of the top side of a handheld device 10 in accordance with one embodiment. Handheld device 10 includes a touchscreen 11 or other user interface, and may also include mechanical keys/buttons. Internal to device 10 are two actuators 14 and 15. Actuator 14 is located on the left side of device 10, and actuator 15 is located on the right side. Actuators 14 and 15 are part of a haptic feedback system that generates vibrations on device 10. Although device 10 includes two actuators, in other embodiments device 10 may include additional actuators. In one embodiment, device 10 includes an actuator in the front and back as well as left and right.

Figure 2:
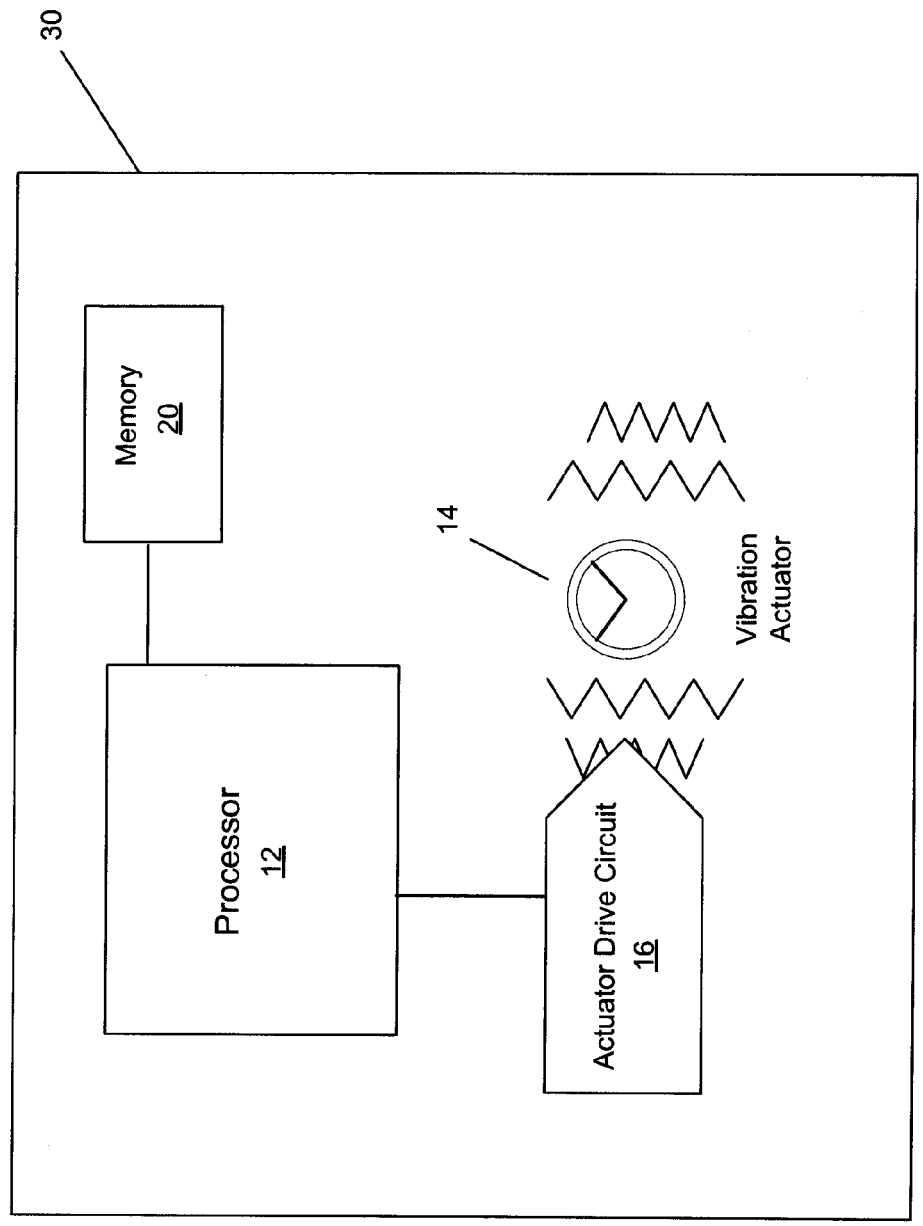
FIG. 2 is a block diagram of the haptic feedback system that includes an actuator.

FIG. 2 is a block diagram of the haptic feedback system 30 that includes actuator 14. Haptic feedback system 30 includes a processor 12 coupled to a memory 20 and an actuator drive circuit 16 which is coupled to vibration actuator 14. Processor 12 may be any type of general purpose processor, or could be a processor specifically designed to provide haptic effects, such as an application-specific integrated circuit ("ASIC"). Processor 12 may be the same processor that operates the entire device 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect.

Processor 12 outputs control signals to drive circuit 16 which includes electronic components and circuitry used to supply actuator 14 with the required electrical current and voltage to cause the desired haptic effects. Actuator 14 is a haptic device that generates a vibration on handheld device 10. Actuator 14 can include one or more force applying mechanisms which are capable of applying a vibrotactile force to a user of device 10. Actuator 14 may be, for example, an electromagnetic actuator, an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys.

Memory device 20 can be any type of storage device or computer-readable medium, such as random access memory ("RAM") or read-only memory ("ROM"). Memory 20 stores instructions executed by processor 12. Memory 20 may also be located internal to processor 12, or any combination of internal and external memory.

One processor 12 and drive circuit 16 can be included in device 10 for each actuator within device 10, or processor 12 and drive circuit 16 can generate and transmit haptic control signals to multiple actuators, such as actuators 14 and 15.

Figure 3:
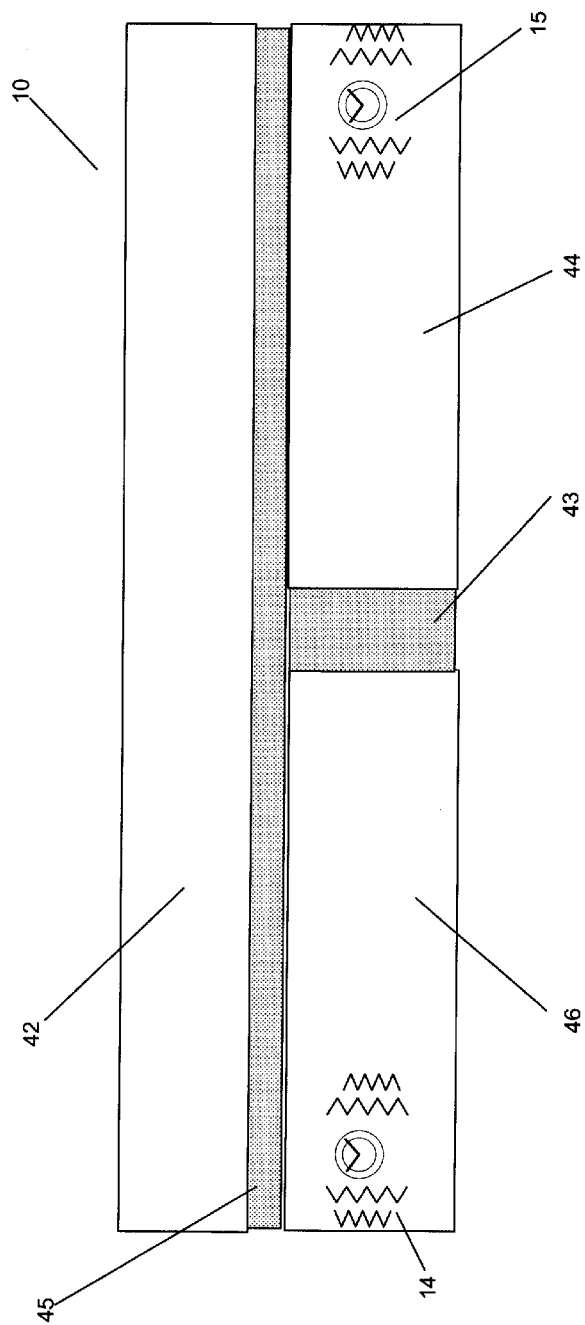
FIG. 3 is a block diagram of a sectional view of the handheld device along line A-A of FIG. 1.

FIG. 3 is a block diagram of a sectional view of handheld device 10 along line A-A of FIG. 1. Handheld device 10 includes separate "substantially mechanically isolated" sections 46 and 44 that each include one of actuators 14 and 15, respectively. Each section 46, 44 is substantially isolated from each other by a vibration isolation barrier 43. Vibration isolation barrier 43 in one embodiment is formed from Poron foam, but it may be formed from any material that generally isolates vibrations but maintains a relative rigidity so that the feel and integrity of the outer housing of device 10 is maintained.

Isolation barrier 43 substantially mechanically isolates sections 46 and 44 by substantially reducing vibration caused by an actuator in section 46 from being transmitted to section 44, and vice versa. In one embodiment, a vibration in section 46 at a 100% amplitude will be reduced in section 44 to about a 30% amplitude. Even though some vibration may transmit through barrier 43, it will be reduced substantially so that a user can easily determine that the vibration is emanating from section 46 and not from section 44 when the vibration is solely generated by actuator 14.

Sections 46 and 44 are further isolated from a common section 42 of device 10 by a vibration isolation barrier 45. In one embodiment, common section 42 is a top portion of device 10, and includes touchscreen 11 and any other user interface. In one embodiment, barrier 45 is formed from the same material as barrier 43. Barrier 45 further isolates vibrations into a specific section that contains the active actuator.

In other embodiments, device 10 will include more actuators than actuators 14 and 15. For example, in one embodiment device 10 includes four actuators—one in the front and back, and one on the left and right side. In these embodiments, each actuator is housed in a separate section, and each section is separated by all other sections, including common section 42, by a vibration isolation barrier. In another embodiment, an actuator will be included in common section 42 so that a vibration can be substantially isolated within common section 42 which includes touchscreen 11.

In an embodiment that includes four actuators (i.e., left, right, front and back), each located in a separate substantially mechanically isolated section, the handheld device can be used to provide directional references to a user. For example, haptic effects can be generated using the following methods: (1) Activate the left actuator followed by the right actuator to simulate movement left to right. This indicates to the user to move to the right. (2) Activate the right actuator followed by the left actuator to simulate movement right to left. This indicates to the user to move to the left. (3) Activate the front actuator followed by the back actuator to simulate movement front to back. This indicates to the user to turn around and move or back up. (4) Activate the back actuator followed by the front actuator to simulate movement back to front. This indicates to the user to move forward. (5) Vary the magnitude or duration of the haptic effects to designate relative nearness to a target destination. For example, the haptic effects get stronger the closer the user gets to the destination.

In one embodiment, handheld device 10 is a video game controller and haptic effects generated on four actuators allow for enhanced effects. For example, when simulating road texture under the tires of a video car, the car's front tires could feel the road through the front actuator and the rear tires would feel road textures through the back actuator. Therefore, for a car moving over a bump in the road, a haptic effect can transfer from the front actuator to the rear actuator as the car progresses over the bump, and as the car is driven from a smooth paved surface to a bumpy dirt road. For the latter, the haptic effects can change based on the change in types of road surfaces. In addition, positional alerts for video vehicles, characters, shields, weapons or damages can be activated using haptic effects on different actuators. For example, for firing weapons, the back actuator with the left/right actuators can be activated to simulate the firing of a rocket, and then the front actuator alone or in concert with the left/right actuators can be activated to feel a more subtle explosion off in the distance. "Gesturing" for videogames can be enhanced. For example, gesturing to "swing" a golf club in a golf game can cause different actuators to be activated to provide a directional indication.

In another embodiment, multiple "channel" ringtones can be generated by generating different vibration-based MIDI instruments playing on different actuators. For example, a bass drum may be generated on the bottom actuator, the vocals may be generated on the top actuator, and melody or other supporting beat instruments may be generated on the left/right actuators. Further, instead of using a single actuator, multiple actuators allow for much greater variety of vibration based caller IDs. Further, during playback of a musical file, such as an MP3 file, different frequency bands may be directed to different regions that include isolated actuators.

As disclosed, a handheld device in according to embodiments include multiple actuators, each enclosed in a substantially mechanically isolated section. Haptic effects generated on the actuators can provide a user with directional information which enhances the usability of the device.

Several embodiments are specifically illustrated and/or described herein. However, it will be appreciated that modifications and variations of are covered by the above teachings and within the purview of the appended claims without departing from the spirit and intended scope of the invention.

What is claimed is:

1. A handheld device comprising:
  a first section comprising a first actuator, wherein the first section is separate from and coupled to a first vibration isolation barrier;
  a second section comprising a second actuator, wherein the second section is separate from and coupled to the first vibration isolation barrier;
  wherein the first section and the second section are separated from each other by the first vibration isolation barrier thereby substantially mechanically isolating the first section and the second section from each other;
  a third section comprising a third actuator and a user interface, the third section at least partially co-extensive with the first section and the second section;
  a second vibration isolation barrier separate from and coupled to the first, second and third sections, and wherein the third section is separated from the first section and the second section by the second vibration isolation barrier thereby substantially mechanically isolating the first section and the second section from the third section; and
  a processor configured to:
    cause the first actuator to provide a first haptic effect and the second actuator to provide a second haptic effect, wherein a series of the first haptic effect and the second haptic effect causes a directional haptic effect from the first section to the second section.

2. The handheld device of claim 1, wherein the user interface comprises a touchscreen.

3. The handheld device of claim 1, wherein the first vibration isolation barrier comprises a Poron foam.

4. The handheld device of claim 1, wherein the first vibration isolation barrier is adapted to cause a vibration generated by the first actuator to have a substantially reduced amplitude in the second section.

5. The handheld device of claim 1, wherein the handheld device comprises a video game controller.

6. The handheld device of claim 1, wherein the processor is configured to cause the directional haptic effect based on an event occurring in a video game.

7. The handheld device of claim 6, wherein the event comprises a firing of a rocket or swinging of a golf club in the video game.

8. The handheld deVice of claim 6, wherein the first haptic effect or the second haptic effect changes based on a change of a road surface simulated in the video game.

9. The handheld device of claim 1, wherein the first, second and third sections are each in contact with at least a portion of the second vibration isolation barrier.

10. A device that generates haptic effects comprising:
   a first section comprising a first actuator, wherein the first section is separate from and coupled to a first vibration isolation barrier; and
   a second section comprising a second actuator, wherein the second section is separate from and coupled to the first vibration isolation barrier;
   wherein the first section and the second section are substantially mechanically isolated from each other by the first vibration isolation barrier;
   a third section comprising a third actuator and a user interface, the third section at least partially co-extensive with the first section and the second section;
   a second vibration isolation barrier separate from and coupled to the first, second and third sections, and wherein the third section is separated from the first section and the second section by the second vibration isolation barrier thereby substantially mechanically isolating the first section and the second section from the third section; and
   a processor configured to:
      cause the first actuator to provide a first haptic effect and the second actuator to provide a second haptic effect that is a different type of haptic effect than the first haptic effect.

11. The device of claim 10, wherein the user interface comprises a touchscreen.

12. The device of claim 10, wherein the first vibration isolation barrier comprises a Poron foam.

13. The device of claim 10, wherein the first vibration isolation barrier is adapted to cause a vibration generated by the first actuator to have a substantially reduced amplitude in the second section.

14. The device of claim 10, wherein the processor is further configured to:
   cause the first actuator to output the first haptic effect and the second haptic effect based on audio output.

15. The device of claim 14, wherein the audio output is associated with MIDI instruments.

16. The device of claim 15, wherein the first haptic effect is based on a first MIDI instrument and the second haptic effect is based on a second MIDI instrument different from the first MIDI instrument.

17. The device of claim 14, wherein the audio output is associated with an MP3 file, 18. The device of claim 17, wherein the MP3 file comprises a first frequency band directed to the first section and a second frequency band different from the first frequency band directed to the second section.

* * * * *